UNITED STATES PATENT OFFICE.

ERWIN HOFFA, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

QUINOPHTHALONESULFONIC ACIDS CONTAINING HALOGEN AND PROCESS OF MAKING SAME.

1,197,632.      Specification of Letters Patent.      Patented Sept. 12, 1916.

No Drawing.      Application filed April 6, 1914. Serial No. 830,046.

*To all whom it may concern:*

Be it known that I, ERWIN HOFFA, Ph. D., chemist, a citizen of the Empire of Germany, residing at Höchst-on-the-Main, Germany, have invented certain new and useful Improvements in Quinophthalonesulfonic Acids Containing Halogen and Processes of Making Same, of which the following is a specification.

I have made the suprising observation that unlike the non-substituted quinolin-yellow, those of its substitution products which contain chlorin in the benzene nucleus of the quinaldin residue, being, however, at the same time substituted in ortho position to the nitrogen, are remarkable for their great fastness to light; this substitution of the halogenated quinaldin in ortho position can have been effected by means of chlorin itself or a methyl group; in the halogenated dyestuff substituted in ortho position to the nitrogen there may be also an additional hydrogen atom replaced by methyl. Therefore, these new products constitute quinophthalones which are derived from halogenated quinaldins and their homologues respectively which contain either a halogen or a methyl group in ortho position to the nitrogen and which consequently correspond to the general formula:

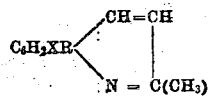

wherein X represents a halogen, hydrogen or methyl, and R represents a halogen or methyl, either of which stands in the benzene nucleus in ortho position to the nitrogen, one of these new products having the formula—

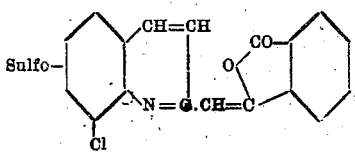

The position of the sulfo group in the formula is not known with certainty. Said new products are distinguished from the dyestuffs described in U. S. Patent No. 890,588 by considerably greater fastness to light.

As parent products for the preparation of such quinaldins as may be employed in the process above referred to, the following bases will, for instance, serve: o-chloranilin, 3-chloro-4-toluidin, 5-chloro-2-toluidin, 6-chloro-2-toluidin.

The following example will illustrate my invention: A mixture consisting of 40 parts of hydrochloric acid, 13 parts of o-chloranilin and 10 parts of paraldehyde is heated for 5 hours to about 100° C. The chloroquinaldin can be isolated from the product of the reaction by any of the methods employed in the preparation of quinaldin. When recrystallized from ligroin it forms a colorless body melting at 68–70° C. 59 parts of the chloroquinaldin thus obtained are heated with 50 parts of phthalic anhydrid for two hours to 200–210° C. The mass, which is at first liquid, solidifies into a yellow crystalline mass, namely the chloroquinophthalone, a body with a very high melting point. The chloroquinophthalone, when heated with ten to twenty times the quantity of oleum containing 20 per cent. of $SO_3$, is converted into the sulfonic acid, which dyes wool yellow tints with a green hue of excellent fastness to light.

Having now described my invention what I claim is:

1. As a new process, the preparation of dyestuffs of the quinolin-yellow series containing halogen and being fast to light, which consists in condensing with phthalic anhydrid the halogenated quinaldins of the general formula:

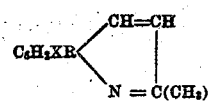

wherein X represents a halogen, hydrogen or methyl, and R represents a halogen or methyl, standing in the benzene nucleus in ortho position to the nitrogen, and sulfonating the resulting substituted quinophthalones.

2. As new products, the quinophthalonesulfonic acids containing halogen, of which the quinaldins, used as starting material, correspond to the formula:

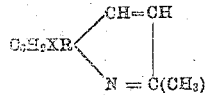

wherein X represents a halogen, hydrogen, or methyl, and R represents a halogen or methyl, standing in the benzene nucleus in ortho position to the nitrogen, the final products obtained therefrom having the general formula:

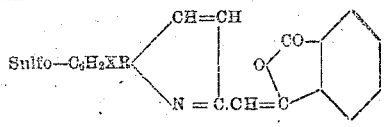

wherein X represents a halogen, hydrogen, or methyl, and R represents a halogen or methyl, standing in the benzene nucleus in ortho position to the nitrogen, constituting yellow water-soluble dyestuffs, dyeing wool yellow tints of excellent fastness to light.

3. As a new product, the ortho-chloro-quinophthalonesulfonic acid, having the formula

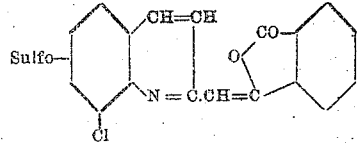

wherein the chlorin atom stands in the benzene nucleus in ortho position to the nitrogen, the product being a yellow powder readily soluble in water, its solution dyeing wool yellow tints with a' green hue and of excellent fastness to light.

In testimony whereof I affix my signature in presence of two witnesses.

ERWIN HOFFA.

Witnesses:
 JEAN GRUND,
 CARL GRUND.